United States Patent
Waldron et al.

(10) Patent No.: US 6,367,681 B1
(45) Date of Patent: Apr. 9, 2002

(54) FRICTION STIR WELDING APPARATUS AND METHOD

(75) Inventors: Douglas J. Waldron, Fountain Valley; Robert Scott Forrest, Santa Ana, both of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/542,735

(22) Filed: Apr. 4, 2000

(51) Int. Cl.⁷ .......................... B23K 20/12; B23K 37/04
(52) U.S. Cl. ...................................... 228/112.1; 228/2.1
(58) Field of Search ................................ 228/2.1, 112.1

(56) References Cited

U.S. PATENT DOCUMENTS

| | | | |
|---|---|---|---|
| 5,697,544 A | * | 12/1997 | Wykes |
| 6,050,474 A | * | 4/2000 | Aota et al. |
| 6,050,475 A | * | 4/2000 | Kinton et al. |
| 6,173,880 B1 | * | 1/2001 | Ding et al. |
| 6,193,137 B1 | * | 2/2001 | Ezumi et al. |

FOREIGN PATENT DOCUMENTS

| | | | |
|---|---|---|---|
| JP | 11320127 A | * | 11/1999 |
| JP | 200061661 A | * | 2/2000 |
| JP | 2000202646 A | * | 7/2000 |
| JP | 02000263251 A | * | 9/2000 |
| JP | 2002038478 A | * | 2/2001 |

* cited by examiner

*Primary Examiner*—Tom Dunn
*Assistant Examiner*—Kiley Stoner
(74) *Attorney, Agent, or Firm*—Alston & Bird LLP

(57) ABSTRACT

A friction stir welding apparatus includes a C-shaped frame having two opposing jaws which are spaced apart to define a space for receiving workpieces which are to be welded together. One of the jaws supports a rotatably driven friction stir welding spindle, and the other jaw supports a back-up tool. The spindle is supported in a polycrystalline thrust bearing disposed in the one jaw for absorbing thrust forces exerted on the spindle during a welding operation. The C-shaped frame may be an integral one-piece structure, in which case the apparatus and workpieces are relatively advanced to cause the spindle to penetrate the workpieces at an edge thereof and to carry the welding tools along a weld path to a second edge of the workpieces, where the spindle exits and disengages the workpieces. Alternatively, the C-shaped frame may comprise a pair of separate jaws which are pivotally connected in scissor fashion, in which case the jaws may be pivotally urged toward one another to carry the welding tools into engagement with the workpieces for performing a welding operation. The C-shaped frame balances and absorbs the large thrust loads imposed on friction stir welding tools.

11 Claims, 2 Drawing Sheets

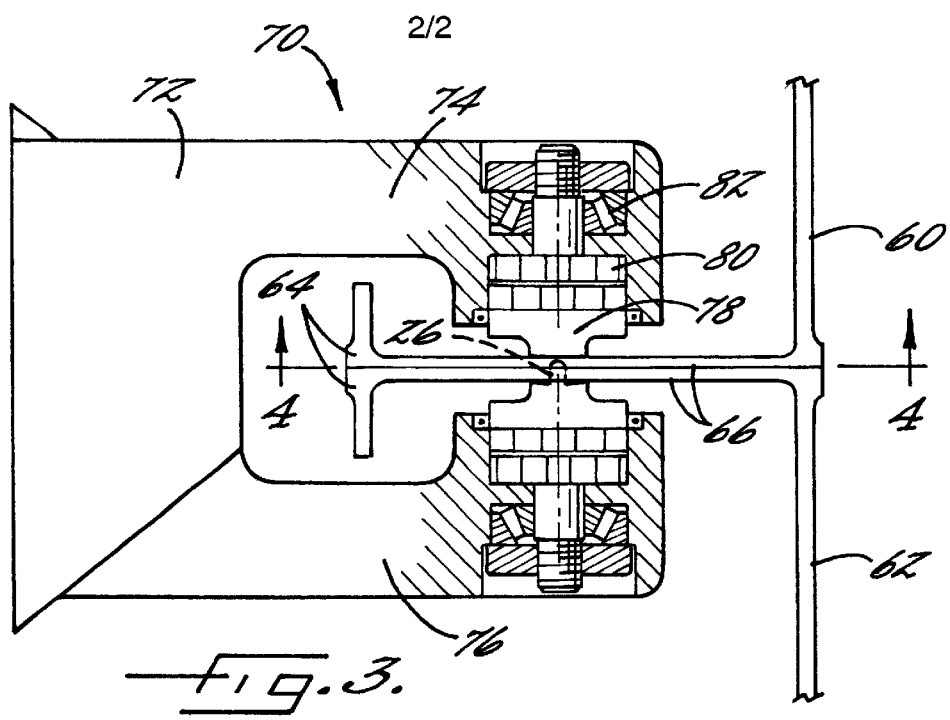
Fig. 3.
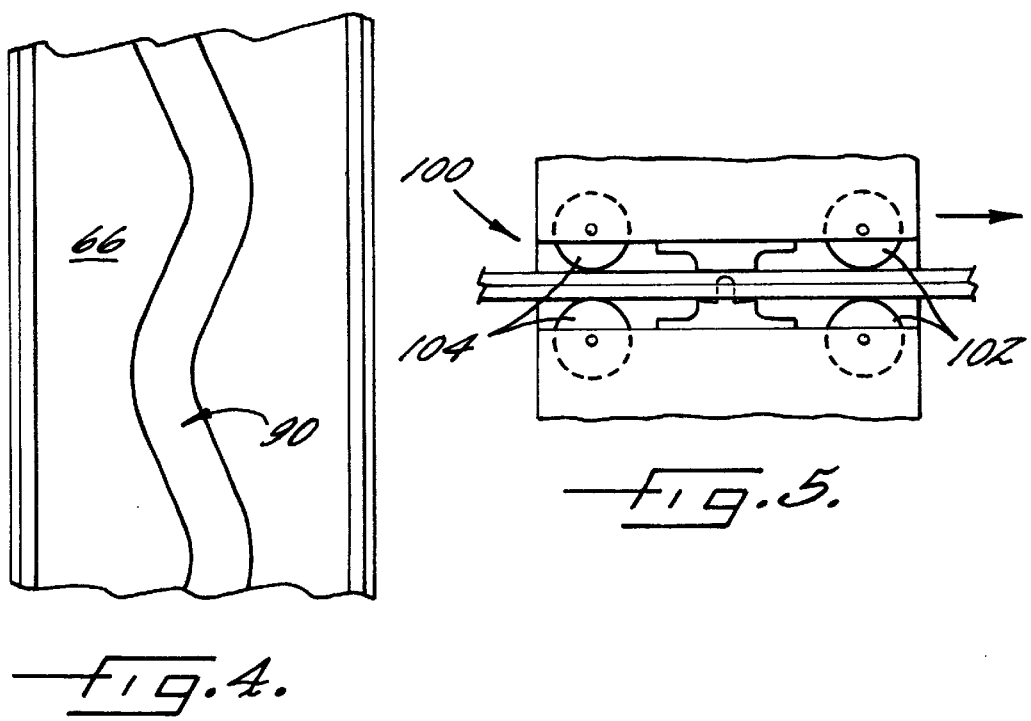
Fig. 4.
Fig. 5.

FRICTION STIR WELDING APPARATUS AND METHOD

FIELD OF THE INVENTION

The present invention relates to friction stir welding and, more particularly, to an apparatus and method for friction stir welding a semi-flexible structure having limited access.

BACKGROUND OF THE INVENTION

Friction stir welding is a known technique for welding together two workpieces along a linear joint therebetween. The friction stir welding process generally involves engaging the material of the two adjoining workpieces on either side of the linear joint by a rotating stir pin or spindle. Force is exerted to urge the spindle and the workpieces together, and frictional heating caused by the interaction between the spindle and the workpieces results in plasticization of the material on either side of the joint. The spindle is traversed along the linear path of the joint, plasticizing material as it advances, and the plasticized material left in the wake of the advancing spindle cools and solidifies to form a weld.

It will be appreciated that large forces must be exerted between the spindle and the workpieces in order to apply sufficient pressure to the workpieces to cause plasticization of the material. For instance, for friction stir welding aluminum alloy plate of ¼-inch thickness, forces of 4000 pounds or more must be exerted between the spindle and the workpieces. In a conventional friction stir welding process, these large forces are absorbed at least partially by a back-up member which engages the workpieces on the "back side" of the weld opposite from the spindle. Where the workpieces have sufficient structural strength and rigidity, part of the welding forces may be absorbed by the workpieces themselves. However, in many cases the workpieces are semi-flexible structures which are incapable of supporting and absorbing the large forces involved in a friction stir welding process. Accordingly, the back-up member is usually supported by a substantial support structure.

Heretofore, application of the friction stir welding process to welding semi-flexible structures has been limited by the requirement that the structure being welded provide sufficient space and suitable access on the back side of the weld for the heavy support structure needed for absorbing the thrust of a friction stir welding tool. Furthermore, the thrusting devices used for applying thrust to the spindle are generally bulky and, consequently, access on the front side of the weld must also be sufficient to accommodate such thrusting devices. Accordingly, there are many types of semi-flexible structures which cannot be welded by conventional friction stir welding devices because the structures do not provide sufficient access on the back side and/or the front side of the joint to be welded.

SUMMARY OF THE INVENTION

The present invention solves the problem of friction stir welding semi-flexible structures having limited access, by providing a compact friction stir welding apparatus having a C-shaped frame which supports the friction stir welding tools and which applies and balances the large forces needed for accomplishing a friction stir welding process. More specifically, the invention comprises a generally C-shaped frame having a pair of opposing jaws which are spaced apart to define a space for receiving a portion of two workpieces to be welded together along a joint therebetween. A rotatable friction stir welding spindle is supported by a first of the jaws and is rotatably driven by a motor disposed in the first jaw. A second friction stir welding tool is supported by the other jaw. The second friction stir welding tool may be rotatable or stationary. Where the second tool is rotatable, a second motor is disposed in the other jaw for rotatably driving the second tool. The friction stir welding tools project toward one another into the workpiece-receiving space between the jaws.

According to one preferred embodiment of the invention, the C-shaped frame is integrally formed of a single piece. The device is advanced with the friction stir welding spindle moving in the plane of the workpieces, so as to carry the friction stir welding spindle into engagement with the edges of two generally planar workpieces which adjoin one another at a joint. The joint may be an lap joint between two overlapping workpieces, a butt joint between abutting edges of the workpieces, a butt joint between the edge of one workpiece and a step or ledge on the other workpiece, or the like, as long as the joint extends between one edge of the workpieces and another edge of the workpieces. The frame is advanced to cause the spindle to penetrate the workpieces at the one edge and travel along a predetermined weld path, and then exit the workpieces at the other edge of the workpieces. The integral C-frame prevents the welding tools from being moved apart from one another as the frame is advanced along the weld path, and absorbs and balances the reaction forces exerted on the welding tools.

In accordance with another preferred embodiment of the invention, the frame is formed of two separate jaws which are pivotally joined in scissor fashion to form a C-shaped frame. The jaws are pivotally urged toward one another to bring the welding tools into engagement with the workpieces and to apply thrust thereto. Pivotal movement of the jaws may be effected by a hydraulic actuator, a ball screw, or other suitable mechanism capable of applying sufficient force to the jaws to enable the tools to perform a friction stir welding process.

The apparatus preferably includes a polycrystalline thrust bearing for supporting the rotating welding tool. The motor advantageously is a hydraulic motor which is built into the bearing assembly. The thrust bearing may be cooled by the same hydraulic fluid which is used to power the hydraulic motor.

The apparatus preferably includes at least one pair of rollers which are affixed to the jaws of the frame in opposing relation to each other. The rollers are positioned to engage the two workpieces on opposite sides of the joint and are adapted to apply pressure to the workpieces to urge the workpieces together at the joint. Two pairs of rollers preferably are employed, one pair ahead of the welding tools in the direction in which the device is advanced along a weld path and the other pair behind the welding tools.

In accordance with a preferred method of the invention, a weld is formed across a joint between two workpieces by disposing the workpieces between a rotatable friction stir welding spindle and a second friction stir welding tool which is spaced apart from the spindle in opposing relation thereto. The spindle and the second friction stir welding tool are supported on two opposing spaced-apart jaws of a C-shaped frame, the jaws straddling the joint between the workpieces. The spindle is rotated, and the device is advanced to engage the spindle with the workpieces, beginning at a first edge of the workpieces. Thrust is applied to the device to advance the spindle in the plane of the workpieces along a predetermined weld path from the first edge to a second edge of the workpieces. The opposing jaws of the frame absorb the forces which are exerted on the spindle and second friction stir welding tool during the welding operation and prevent the spindle and second friction stir welding tool from moving apart from one another. In accordance with one preferred embodiment of the invention, the opposing jaws of the C-shaped frame are separately formed members which are pivotally joined, and accordingly the welding tools are advanced toward one another and into engagement with the workpieces and the thrust is applied by urging the opposing jaws toward each other. The device is then advanced along the weld path to form a weld.

In accordance with another preferred method of the invention which is particularly beneficial for forming an elongated weld in the plane of two generally planar workpieces which are adjoined at a joint which extends from a first edge to a second edge of the workpieces, a rotatable friction stir welding spindle and a back-up tool are supported on first and second opposing jaws of a C-shaped frame, as previously described. The spindle has a length which is selected in accordance with the depth of the weld to be formed between the workpieces. The spindle and back-up tool are located with respect to one another in predetermined desired positions which are to be maintained throughout the welding operation. The spindle is rotated, and the C-shaped frame is advanced toward the workpieces to bring the spindle into engagement with the first edge of the workpieces and the workpiece-contacting surface of the back-up tool into contact with an outer surface of one of the workpieces. Force is applied to the frame to urge the frame to carry the spindle and back-up tool along the weld path, the spindle penetrating the workpieces at the first edge and exiting and disengaging the workpieces at the second edge. The frame is advanced along the weld path with the opposing jaws disposed on opposite sides of the workpieces, the frame preventing the spindle and back-up tool from being moved apart from one another. Thus, rather than advancing the welding tools toward each other to engage and penetrate the workpieces, the tools are preset in desired welding positions, and the frame is advanced to cause the spindle to penetrate the workpieces from one edge and to exit the workpieces at another edge. The thrust force which is exerted on the frame to advance the tools along the weld path is in a direction lying substantially in the plane of the generally planar workpieces, which is a direction in which the workpieces have substantial stiffness. The reaction forces on the tools which act in directions tending to move the tools apart from each other are absorbed and balanced by the C-shaped frame. Accordingly, the method is applicable to welding semi-flexible structures, without any need for a heavy support structure for absorbing the large forces involved in the friction stir welding process.

In a further preferred embodiment of the invention, the C-frame welding apparatus is advanced along a predetermined curvilinear weld path for improving stress distributions within the welded workpieces.

BRIEF DESCRIPTION OF THE DRAWINGS

Additional objects, features, and advantages of the invention will become apparent from the following detailed description of specific embodiments thereof, taken in conjunction with the accompanying drawings.

FIG. 3 is a cross-sectional view similar to FIG. 2, showing a second embodiment of the invention, and also showing the apparatus in the process of forming a weld, with the spindle penetrating the workpieces;

FIG. 4 is a cross-sectional view taken on line 4—4 of FIG. 3, illustrating a curvilinear weld path along which the apparatus is advanced for forming a curvilinear weld; and FIG. 5 depicts a front elevational view of a third welding apparatus in accordance with the invention, including two pairs of rollers for engaging opposite sides of workpieces and urging the workpieces together to keep the joint pressed tightly together.

DETAILED DESCRIPTION OF THE DRAWINGS

Figure 1:
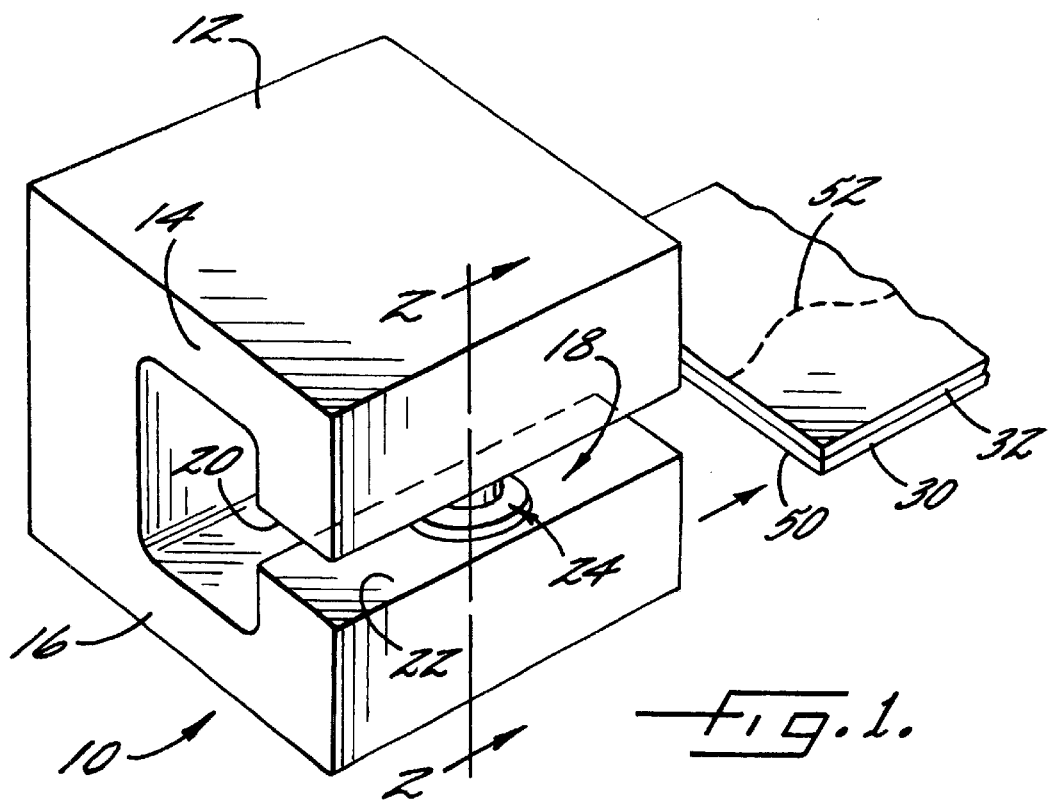
FIG. 1 is perspective view of a welding apparatus in accordance with a first embodiment of the invention, showing the apparatus being advanced to engage a pair of overlapping workpieces.

With reference to FIG. 1, a friction stir welding apparatus in accordance with a first preferred embodiment of the invention is indicated broadly by reference numeral 10. The apparatus includes a generally C-shaped frame 12 having a pair of opposing jaws 14 and 16 which are spaced apart to define a workpiece-receiving space 18 therebetween. The C-shaped frame 12 comprises an integral one-piece structure of substantial stiffness for supporting the large forces which must be exerted on workpieces during a friction stir welding operation. The frame 12 preferably is made of a high-strength material, such as steel, titanium, or the like.

The jaws 14 and 16 of the apparatus 10 include opposing generally planar surfaces 20 and 22, respectively, which are parallel and spaced apart. The jaw 16 has a rotatable friction stir welding tool 24 mounted in the jaw and projecting above the surface 22. The tool 24 includes a spindle 26 which extends into the workpiece-receiving space 18 generally normally toward the opposite surface 20 of the opposing jaw 14. The jaw 14 has a back-up tool 28 mounted therein and projecting above the surface 20 toward the spindle 26. The rotating tool 24 and back-up tool 28 may be any suitable tools for performing a friction stir welding operation on workpieces of a predetermined material type and thickness, such as the workpieces 30 and 32 shown in FIG. 1. The spindle 26 is adapted to penetrate the workpieces and plasticize the material on both sides of the joint between the workpieces, and the back-up tool 28 applies a containing load on the mixing process occuring within the plastic zone. Friction stir welding is a known technique for welding two or more workpieces together at a joint therebetween. The process is described in U.S. Pat. No. 5,460,317, the disclosure of which is incorporated herein by reference.

The friction stir welding tool 24 is rotatably supported in the jaw 16 by a thrust bearing, preferably a polycrystalline diamond thrust bearing 34. A shaft 36 attached to the tool 24 extends through the polycrystalline diamond thrust bearing 34 and has a frustoconical collar 38. A tapered roller bearing 40 engages the collar 38.

The rotatable tool 24 can be rotatably driven by any of a number of devices (not shown), including a hydraulic motor built into the bearing assembly, an electric motor, a pneumatic motor, or equivalent device. Advantageously, where a hydraulic motor built into the bearing assembly is used, the hydraulic fluid used for powering the motor can be used for cooling the polycrystalline bearing 34.

As shown in FIG. 1, a welding operation is performed by advancing the apparatus 10 toward a first edge 50 of the workpieces, or alternatively advancing the workpieces toward the apparatus. The workpieces are received in the workpiece-receiving space 18, and the spindle 26 engages the edge 50 while the back-up tool 28 contacts the outer surface of the workpiece 32. The apparatus 10 is advanced by a suitable actuator (not shown) so as to cause the spindle 26 to penetrate into the edge 50 by frictionally heating the material of the workpieces, and is then advanced along a predetermined weld path in the plane of the workpieces until the spindle 26 emerges from a second edge of the workpieces at the other end of the weld path. The weld path need not be linear. For example, the apparatus 10 may be advanced along the weld path 52.

Figure 2:
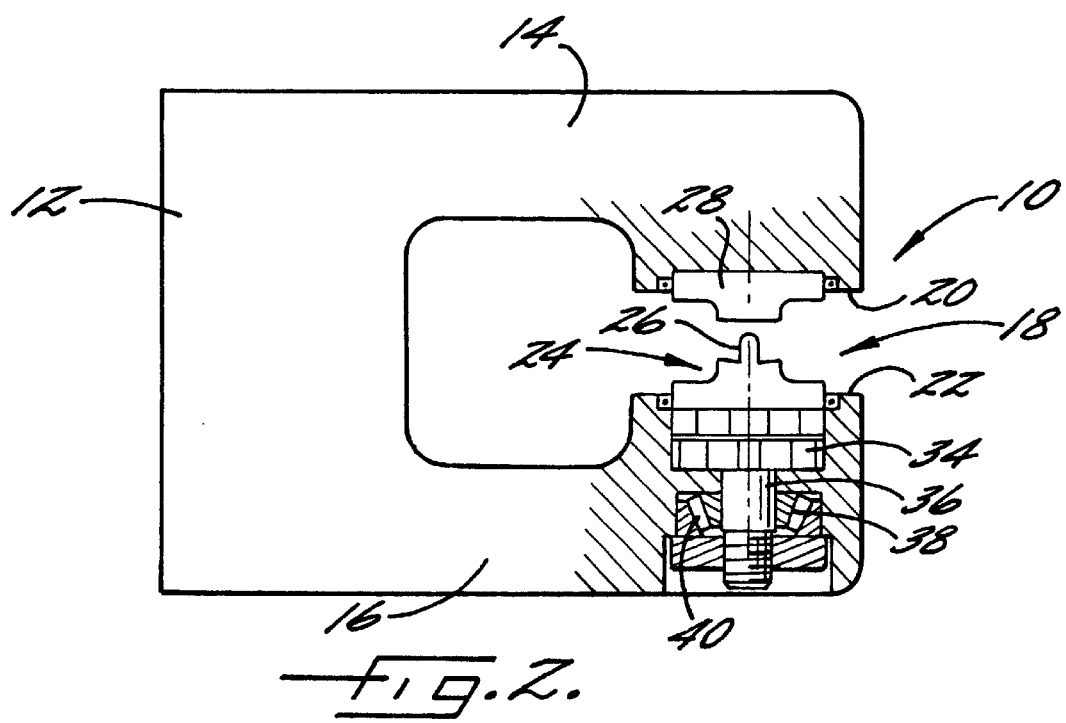
FIG. 2 is cross-sectional view taken on line 2—2 of FIG. 1.

The workpieces need not be entirely planar. For instance, FIG. 3 depicts an illustrative example of a structure that can be welded by an apparatus in accordance with the invention. The structure comprises two workpieces 60 and 62 having L-shaped flanges 64 which are to be welded together within planar portions 66 thereof. FIG. 3 also depicts a second preferred embodiment of a friction stir welding apparatus 70 in accordance with the invention. The apparatus 70 has a scissor frame 72 comprising separately formed jaws 74 and 76 which are pivotally joined together in scissor fashion so as to be pivotally movable with respect to each other. Thus, a weld formed by the apparatus 70 need not originate at an edge of the workpieces. Rather, the welding tools may be positioned at an interior location of the planar portions 66, if desired, and the jaws 74 and 76 urged toward one another by a suitable actuation means (not shown) such as ball screws, acme screws, hydraulic actuators, or the like, so as to cause the spindle 26 to penetrate the workpieces to an appropriate depth. The jaws 74 and 76 may then be held in position and the apparatus may be advanced along a desired weld path, as with the apparatus 10 of FIGS. 1 and 2.

The apparatus 70 also includes a back-up tool 78 which is rotatable. The back-up tool 78 is rotatably supported in the jaw 74 by a thrust bearing, preferably a polycrystalline diamond thrust bearing 80, and a tapered roller bearing 82. The tool 78 is rotatably driven by a hydraulic motor, electric motor, or pneumatic motor (not shown) similar to the motor used for driving the spindle 26. By providing the back-up tool 78 to be rotatable rather than stationary, the back-up tool 78 creates additional heating of the workpiece so as to enable faster welds and deeper penetrations to be effected.

FIG. 4 depicts an exemplary weld which may be formed by the apparatus 70 of FIG. 3. The apparatus is advanced to carry the welding tools along a curvilinear weld path 90. The weld path 90 may be determined based on known loads which the structure is required to support in use, so as to achieve a desired stress distribution within the weld and the structure.

FIG. 5 depicts a third preferred embodiment of the invention. The apparatus 100 includes a pair of rollers 102 ahead of the friction stir welding tools, and a second pair of rollers 104 behind the welding tools. The rollers 102 and 104 urge the workpieces together to assure a tight joint therebetween. The positioning of the rollers in FIG. 5 is merely exemplary, it being understood that the rollers may be positioned differently depending on the particular structure being welded and the direction along which load must be applied to assure a tight joint.

From the foregoing description of certain preferred embodiments of the invention, it will be appreciated that the apparatus of the invention permits the welding of semi-flexible structures without the need for a large, heavy support for absorbing the thrust loads of the friction stir welding tools. The frame of the apparatus absorbs and balances the thrust loads, and is compact in comparison with conventional friction stir welding devices, making friction stir welding feasible for semi-flexible structures which cannot be welded with conventional devices.

Various modifications and substitutions of equivalents may be made to the exemplary embodiments described herein. Accordingly, it will be understood that the scope of the invention is not limited to these exemplary embodiments, but is to be determined in accordance with the appended claims.

What is claimed is:

1. A friction stir welding apparatus, comprising:
   a rotatably driven friction stir welding tool adapted to penetrate a joint between a pair of workpieces and plasticize the material of the workpieces on either side of the joint;
   a second friction stir welding tool adapted to apply a containing load on the workpieces in opposition to the rotatably driven friction stir welding tool; and
   a generally C-shaped frame having first and second spaced-apart jaws opposing one another and defining a workpiece-receiving space therebetween, the first jaw rotatably supporting the rotatably driven friction stir welding tool and the second jaw supporting the second friction stir welding tool, the frame absorbing thrust loads applied to the welding tools and being adapted to maintain the rotatably driven friction stir welding tool in penetrating engagement with the workpieces.

2. The friction stir welding apparatus of claim 1 wherein the frame is integrally formed of a single piece.

3. The friction stir welding apparatus of claim 1 wherein the jaws of the frame are separately formed members which are pivotally joined in scissor fashion.

4. The friction stir welding apparatus of claim 1, further comprising a polycrystalline thrust bearing disposed in the first jaw and supporting the rotatably driven friction stir welding tool for absorbing forces exerted thereon during a welding operation.

5. The friction stir welding apparatus of claim 1, further comprising at least one pair of rollers affixed to the jaws in opposing relation to one another, the rollers being positioned to engage two workpieces on opposite sides of a joint therebetween and urge the two workpieces together at the joint.

6. The friction stir welding apparatus of claim 1, wherein the second friction stir welding tool is non-rotatable.

7. The friction stir welding apparatus of claim 1, wherein the second friction stir welding tool is rotatably supported in the second jaw and is rotatably driven.

8. The friction stir welding apparatus of claim 7, further comprising a polycrystalline thrust bearing disposed in the second jaw for rotatably supporting the second friction stir welding tool.

9. A method of forming a weld across a joint defined between two workpieces, comprising:
   disposing the workpieces between a rotatably driven friction stir welding spindle and a second friction stir welding tool which are spaced apart in opposing relation;
   supporting the spindle and the second friction stir welding tool on two opposing spaced-apart jaws of a C-shaped frame, the jaws straddling the joint between the workpieces;
   advancing the frame to cause the spindle and second friction stir welding tool to engage the workpieces and the spindle to penetrate the workpieces and form a weld across the joint;
   advancing the frame to carry the welding tools along a predetermined weld path f the workpieces; and
   using the opposing jaws of the frame to absorb forces which are exerted on the spindle and second friction stir welding tool during a welding operation and to prevent the spindle and second friction stir welding tool from moving apart from one another;

wherein the step of supporting the spindle and second friction stir welding tool comprises supporting the spindle and second friction stir welding tool on two opposing jaws which are pivotally joined together in scissor fashion to form a C-shaped frame, and wherein the step of advancing the frame comprises pivotally moving the jaws relatively toward one another to bring the welding tools into engagement with the workpieces.

10. The method of claim 9 wherein the step of supporting the spindle comprises supporting the spindle in a polycrystalline thrust bearing disposed in the jaw which supports the spindle.

11. A method of forming an elongated weld between two generally planar workpieces adjoined at a joint lying generally in the plane of the workpieces, the method comprising:

supporting a rotatably driven friction stir welding spindle and a back-up tool on first and second jaws, respectively, of a C-shaped frame, the jaws being spaced apart in opposing relation to define a workpiece-receiving space therebetween, the spindle and back-up tool projecting into the workpiece-receiving space in opposing relation to one another;

advancing the C-shaped frame and the workpieces relatively toward one another to bring the spindle into engagement with a first edge of the workpieces and a workpiece-contacting surface of the back-up tool into contact with an outer surface of one of the workpieces; and urging the C-shaped frame to carry the spindle and back-up tool along a predetermined weld path through the workpieces from the first edge to a second edge of the workpieces, the spindle penetrating the workpieces at the first edge and exiting and disengaging the workpieces at the second edge, the frame being advanced along the weld path with the opposing jaws disposed on opposite sides of the workpieces, the frame preventing the spindle and back-up tool from being moved apart from one another;

wherein the back-up tool is rotatable, and wherein the step of supporting the spindle and back-up tool further comprises supporting the spindle and the back-up tool by a pair of polycrystalline thrust bearings disposed in the opposing jaws of the C-shaped frame, the thrust bearings absorbing the forces which are exerted on the spindle and back-up tool during a welding operation.

\* \* \* \* \*

UNITED STATES PATENT AND TRADEMARK OFFICE
CERTIFICATE OF CORRECTION

PATENT NO.     : 6,367,681 B1                                          Page 1 of 1
DATED          : April 9, 2002
INVENTOR(S)    : Waldron et al.

It is certified that error appears in the above-identified patent and that said Letters Patent is hereby corrected as shown below:

Title page,
Item [56], References Cited, U.S. PATENT DOCUMENTS, insert the following:
-- 6,070,784    6/2000  Holt et al. --.
FOREIGN PATENT DOCUMENTS, insert the following:
--     JP  20000-60517      2/1998
       DE  19956963A1       6/2001
       WO WO98/13167        4/1998 --;
"2002038478" should read -- 2001-038478 --.

Column 6,
Line 65, "f" should read -- of --.

Signed and Sealed this

Twenty-second Day of October, 2002

Attest:

Attesting Officer

JAMES E. ROGAN
Director of the United States Patent and Trademark Office